United States Patent [19]

Ahlinder et al.

[11] Patent Number: 4,752,440
[45] Date of Patent: Jun. 21, 1988

[54] CONTROL ROD FOR NUCLEAR REACTOR

[75] Inventors: Siwe Ahlinder; Sven Höök; Erik Jönsson; Kjell Morlin, all of Västerås

[73] Assignee: AB Asea-Atom, Västerås, Sweden

[21] Appl. No.: 71,590

[22] Filed: Jul. 8, 1987

Related U.S. Application Data

[63] Continuation of Ser. No. 771,726, Sep. 3, 1985, abandoned.

[30] Foreign Application Priority Data

Sep. 3, 1984 [SE] Sweden .................................. 8404389

[51] Int. Cl.$^4$ ............................................. G21C 7/10
[52] U.S. Cl. ...................................... 376/333; 376/327
[58] Field of Search ................................. 376/333, 327

[56] References Cited

U.S. PATENT DOCUMENTS

| | | | |
|---|---|---|---|
| 3,448,008 | 6/1969 | Hellman | 376/327 |
| 4,285,769 | 8/1981 | Specker et al. | 376/327 |

FOREIGN PATENT DOCUMENTS

| | | | |
|---|---|---|---|
| 0074697 | 7/1978 | Japan | 376/333 |
| 0011387 | 2/1981 | Japan | 376/333 |
| 0079181 | 5/1984 | Japan | 376/333 |

Primary Examiner—Harvey E. Behrend
Attorney, Agent, or Firm—Watson, Cole, Grindle & Watson

[57] ABSTRACT

A control rod for a nuclear reactor comprises a number of elongated absorber plates (13-16) which are each provided with a plurality of channels (18b), said channels extending substantially perpendicularly to the longitudinal direction of the absorber plate, containing powdered boron carbide or other powdered absorber material which gives off gas and swells upon irradiation, and being hermetically separated from the surroundings of the control rod by an edge portion (30), which is arranged at an edge (31) running in the longitudinal direction of the absorber plate and comprises a gas-tight edge (31) and a longitudinal space (32) arranged inside said edge and being in open communication with and permitting a gas flow between the different channels in the absorber plate. Between the powdered absorber material and the edge portion there is arranged, in a plurality of channels (18b), a body (21) of hafnium or other metallic absorber material which allows the passage of gas but prevents or radically counteracts the passage of powdered absorber material.

8 Claims, 2 Drawing Sheets

A-A

CONTROL ROD FOR NUCLEAR REACTOR

This application is a continuation, of application Ser. No. 771,726, filed Sept. 3, 1985, now abandoned.

BACKGROUND OF THE INVENTION

Field of the Invention

The present invention relates to a control rod for nuclear reactors which comprises a number of elongated absorber plates which are each provided with a plurality of channels, these channels extending substantially perpendicularly to the longitudinal direction of the absorber plate, and containing powdered boron carbide or other powdered absorber material which gives off gas and swells upon irradiation, these channels being hermetically separated from the surroundings of the control rod by an edge portion which is arranged at an edge running in the longitudinal direction of the absorber plate and which comprises a gas-tight edge, a longitudinally-extending space being provided inside the edge and in open connection with and permitting a gas flow between the different channels in the absorber plate.

The Prior Art

A control rod of this kind is known from U.S. Pat. No. 3,448,008.

According to this U.S. patent, the edge portion comprises an outwardly sealed, longitudinally extending slot in the absorber plate in which a longitudinal bar is arranged to cover in part the orifices of the channels at the bottom of the slot.

When boron carbide is subjected to irradiation, helium gas is formed. Since absorber plates in a control rod are not subjected to uniform irradiation, the amount of gas developed will be different in different channels with absorber material. In the known control rod described above, an equalization of the gas pressure arising is achieved in the different channels by the fact that, as mentioned above, the channels are sealed with an edge portion which permits a gas flow between the different channels.

Another property of boron carbide is that it swells upon irradiation. The present invention is based on the realization that the life of a control rod can be considerably extended if measures are taken to counteract the consequences of the swelling. An extension of the life is of the utmost importance. It involves not only reduced costs of new control rods but also reduced costs for taking care of and disposal of spent control rods.

SUMMARY OF THE INVENTION

The swelling of the abosrber material in a channel may cause stress corrosion in the construction material in the channel surrounding the absorber material, that is, in the material of which the control rod is manufactured. The risk of cracks in the construction material caused by stress corrosion increases with increasing irradiation and swelling of the absorber material. If a crack occurs at a channel, a transportation of boron carbide from the channel takes place so that the channel is depleted of boron carbide. In addition, a transportation of absorber material from other nearby, undamaged channels occurs, especially in the region located nearest the edge portion, because the edge portion does not efficiently prevent the transportation of liquid from the defective channel to an undamaged channel and the transportation of liquid together with absorber material from an undamaged channel to the defective channel and from there to the surroundings.

According to the present invention, the above-mentioned transportation of powdered absorber material is prevented or radically counteracted by arranging, between the powdered absorber material and the edge portion in a plurality of channels, a body consisting of hafnium or other metallic absorber material, this body forming between it and the inner wall of the channel a gap which permits a gas flow but which is smaller than at least the main part of the grains in the powdered absorber material. The channels and this body preferably have a circular cross-section and the body preferably a circular-cylindrical shape.

A transportation of absorber material can be very efficiently counteracted according to the present invention by the fact that a gap with an accurately predetermined width can be achieved without difficulty between the channel and the body of metallic absorber material. This result can be achieved without the outer dimensions of the control rod having to be changed or its neutron-absorbing capacity having to be significantly reduced. Preventing such transportation only by the use of the edge portion would require additional, very time-consuming operations in connection with the pressing and welding operations which are part of its manufacture, and would furthermore yield an unreliable result owing to the nature of these work operations.

In the powdered absorber material, preferably at least 50% of the grains have a size exceeding 0.13 mm.

The gap between the inner wall of the channel and the body of metallic absorber material (the distance between the inner wall of the channel and the surface of the body in a direction perpendicularly to the longitudinal direction of the channel) preferably amounts to 0.01–0.13 mm. If the channel and the body have circular cross-section, the body has a diameter which is preferably 0.01–0.13 mm smaller than the diameter of the channel. The length of the body preferably amounts to 5–25 mm.

DESCRIPTION OF THE DRAWINGS

The invention will be described in greater detail by describing an embodiment with reference to the accompanying drawing, wherein.

DETAILED DESCRIPTION OF THE PREFERRED EMBODIMENT

Figure 1:
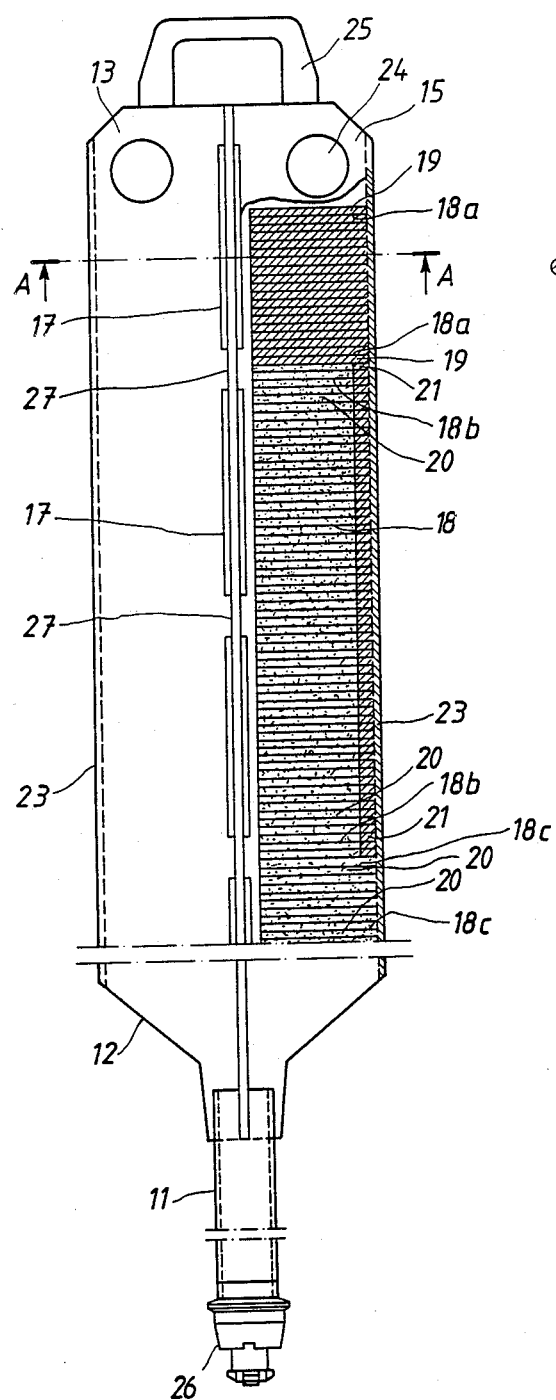
FIG. 1 shows a side view, partially in section in the longitudinal direction of the absorber plates, and FIG. 2 a cross-section of a control rod according to the invention.
Figure 2:
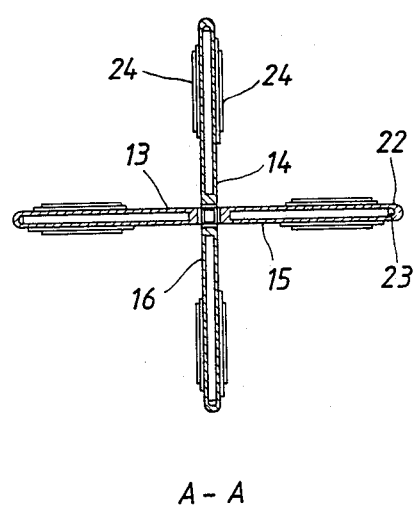
Figure 4:
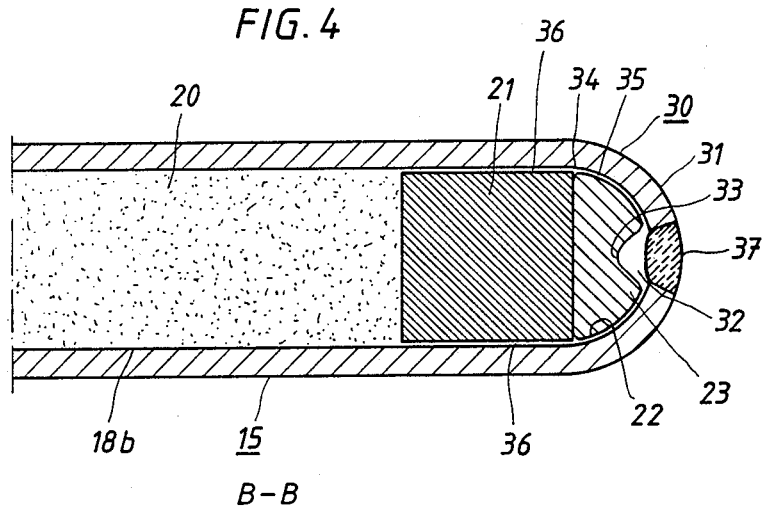
FIGS. 4 and 5 show two sections perpendicular thereto.
Figure 5:
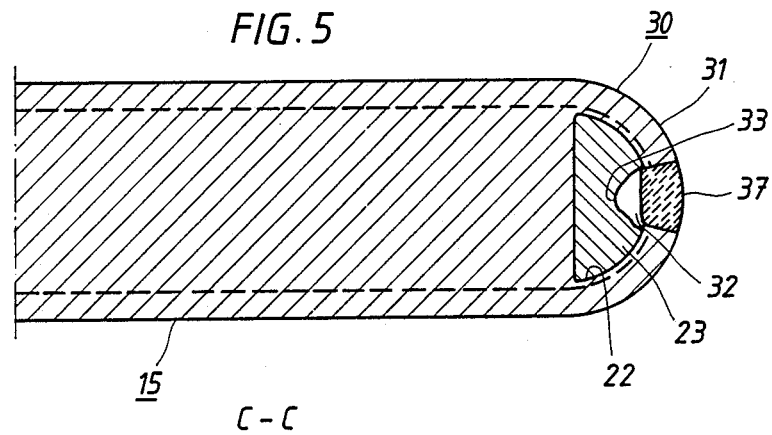

The control rod shown in FIGS. 1 and 2 is substantially manufactured from stainless steel and consists of an absorber section 12 supported by a vertically arranged coupling bar 11. Ths absorber section consists of four elongated absorber plates 13–16 arranged in cruciform configuration, the centre line of the cross coinciding with that of the coupling bar. The absorber plates are provided at the centre of the control rod with cutouts 17 and connection pieces 27 and are welded to each other at the connection pieces and at a supporting filling piece having square cross-section which is arranged adjacent to the connection pieces. The plates which have a thickness of 8 mm are provided with a large number of bored channels 18 (18a-c) having a diameter of 6 mm and a depth of 100 mm. The distance between the envelope surfaces of two adjacent holes is 2 mm. The uppermost channels 18a, which are most exposed to radiation, are filled with rods of hafnium metal with the same length as the channels. Hafnium does not swell upon irradiation. The channels 18b arranged therebelow are filled with powdered boron carbide 20 except for the part positioned furthest from the centre which is filled with a circular-cylindrical body 21 of hafnium metal. At least 50% of the boron carbide consists of grains having a grain size exceeding 0.13 mm. The body 21 has a diameter which is 0.06 mm smaller than the diameter of the channel and a length of 15 mm. The channels 18c arranged at the bottom, where the least irradiation occurs, are filled in their entirety with powdered boron carbide 20 of the above-mentioned kind. That edge of each absorber plate which faces away from the centre line of the rod is provided with a slot 22, in which here is arranged a bar 23. At least in the upper part the bar is suitably made of a metallic neutron-absorber material, e.g., hafnium metal. It may also in its entirely, and at least in the lower part, be of, for example, stainless steel. The application of the bar in the slot and the sealing of the slot are described in greater detail in connection with the explanation of FIGS. 3-5. For guiding the control rod in the relatively narrow gaps between the fuel boxes of the reactor, it is provided at the top with guide pads 24 of Inconel. In addition, it is provided with a lifting handle 25 for handling the rod during installation and replacement. At the lower part the rod is arranged with a coupling head 26 by means of which the rod can be connected to a rod drive mechanism of the reactor.

Figure 3:
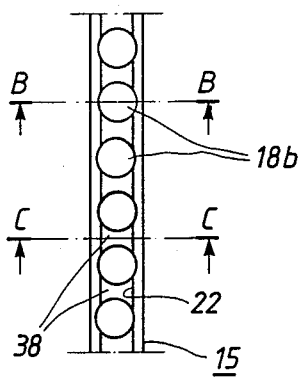
FIG. 3 shows a cross-section, parallel to the centre line of the control rod, of an absorber plate inside the edge thereof facing away from the centre line of the control rod.

FIG. 3 shows a number of the channels 18b in the absorber plate 15 as well as the slot 22, which in the exemplified case has a width of 5.5 mm in its entire length. As is illustrated more clearly in FIGS. 4 and 5, the absorber plate has an edge portion 30 comprising a gas-tight edge 31, a longitudinal space 32 arranged inside the gas-tight edge, and a longitudinal bar 23 arranged in the slot 22 and having the same width as the slot and being provided with a longitudinal indentation 33 which serves as a limiting wall for the space 32. The bar does not entirely cover the orifices 34 of the channels which communicate with the slot as its width is smaller than the diameter of the channels, which diameter, as previously mentioned, amounts to 6 mm in the exemplified case. In this way a gap 35 is formed between the bar and the side walls of the slot, where the channels are located, but not where the side walls of the slot make contact with the bar in the portions 38 (FIG. 3) where no channels are bored and the side walls of the slot are therefore thicker. The channels 18b, as well as the channels 18a and 18c, are in open communication via the gaps 35 with the space 32, so that gas formed upon irradiation of the powdered absorber material is able to flow between the different channels in the plate and a pressure equalization be achieved. The gap 36 between the body 21 of hafnium metal and the inner wall of the channel 18b allows a gas flow but prevents or counteracts radically a simultaneous transportation of absorber material from the channel. In this way, the transportation of absorber material from an undamaged channel to a channel exhibiting a crack, and from there to the surroundings of the control rod, is prevented or counteracted. The gap 36 (the distance between the inner wall of the channel 18b and the surface of the body 21) is thus narrower than the gap 35 (the distance between the inner wall of the edge 31 and the surface of the bar 23 at the side of the space 32) and furthermore longer. The gap 36 is also narrower than the cross-section of the space 32, that is, narrower than transport paths for the gas which are located in the edge portion.

In the manufacture of an absorber plate, the channels 18 are bored from a longitudinally extending edge on a plane-parallel plate. Thereafter, the slot 22 is cut out. After filling the channels with absorber material, the bar 23 is applied in the slot and the side walls of the slot, which are straight at the beginning, are pressed against the bar and welded together at the end surfaces while forming a gas-tight edge 31. The weld joint is designated 37. The slot is also sealed with weld joints at its ends at the top and bottom of the absorber plate.

The invention has been described in greater detail in connection with the use of boron carbide as powdered absorber material and hafnium as metallic absorber material. The invention is also applicable to the use of other known powdered absorber materials such as europium in the form of oxide or another compound and other known metallic absorber materials such as a silver-indium-cadmium alloy (80% Ag, 15% In, 5% Cd) and stainless boron steel.

We claim:

1. In a control rod for nuclear reactors which comprises a number of elongated absorber plates, each absorber plate including a plurality of channels which extend substantially perpendicularly to the longitudinal direction of the absorber plate, some of said channels containing a powdered neutron-asborber material composed of grains and which gives off gas and swells upon irradiation, said channels which contain a powdered neutron-absorber material which gives off gas and swells upon irradiation having a circular cross section, each absorber plate including an edge portion which extends in the longitudinal direction of the absorber plate and comprises a gas-tight edge and a longitudinal space located inside said gas-tight edge, said longitudinal space being in open communication with and permitting a gas flow between said channels in the absorber plate, the improvement wherein a separate elongated body of metallic neutron-absorber material is located between the powdered neutron-absorber material and the edge portion in a plurality of said channels which contain powdered neutron-absorber material which gives off gas and swells upon irradiation, each said elongated body having a circular cross section and a predetermined diameter which is less than the diameter of the channel in which it is positioned, thereby providing a predetermined gap between said elongated body and the inner wall of the channel in which it is positioned, said predetermined gap being smaller than the size of at least 50% of the grains of said powdered neutron-absorber material, thus allowing gas to flow therethrough but counteracting simultaneous movement of the grains of said powdered neutron-absorber material therethrough.

2. A control rod according to claim 1, wherein each said separate body of metallic neutron-absorber material has a circular-cylindrical shape.

3. A control rod according to claim 1, wherein each said edge portion comprises an outwardly sealed slot which contains said longitudinal space.

4. A control rod according to claim 3, wherein a longitudinal bar is located in said slot between the longitudinal space and the channels, said longitudinal bar covering a portion of the cross sections of the orifices of all of said channels.

5. A control rod according to claim 4, wherein said bar consists of a metallic neutron-absorber material along at least a part of its length.

6. A control rod according to claim 1, wherein said edge portion of each absorber plate constitutes an edge facing outwardly, as seen from the centre of the control rod.

7. A control rod according to claim 1, wherein said powdered neutron-absorber material consists of boron carbide.

8. A control rod according to claim 1, wherein said metallic neutron-absorber material consists of hafnium.

* * * * *